United States Patent [19]
Stoevhase et al.

[11] Patent Number: 5,748,612
[45] Date of Patent: May 5, 1998

[54] METHOD AND APPARATUS FOR IMPLEMENTING VIRTUAL CIRCUITS IN A FIBRE CHANNEL SYSTEM

[75] Inventors: Bent Stoevhase, Toronto; Kumar Malavalli, Markham, both of Canada

[73] Assignee: McDATA Corporation, Broomfield, Colo.

[21] Appl. No.: 511,335

[22] Filed: Aug. 10, 1995

[51] Int. Cl.[6] .................................. H04J 3/16; H04J 3/14
[52] U.S. Cl. ........................ 370/230; 370/244; 370/468
[58] Field of Search ................................... 370/230, 235, 370/236, 242, 244, 216, 217, 218, 395, 397, 221, 225, 227, 228, 248, 357, 360, 384, 468; 340/825.01, 826; 395/286, 200.8

[56] References Cited

U.S. PATENT DOCUMENTS

| | | |
|---|---|---|
| 4,999,829 | 3/1991 | Fite et al. ............................ 370/218 |
| 5,060,226 | 10/1991 | Gewin et al. ........................ 370/244 |
| 5,126,999 | 6/1992 | Munter et al. . |
| 5,130,975 | 7/1992 | Akata . |
| 5,136,582 | 8/1992 | Firoozmand . |
| 5,185,736 | 2/1993 | Tyrrell et al. . |
| 5,239,537 | 8/1993 | Sakauchi ............................. 370/395 |
| 5,247,626 | 9/1993 | Firoozmand . |
| 5,255,266 | 10/1993 | Watanabe et al. . |
| 5,291,481 | 3/1994 | Doshi et al. . |
| 5,313,582 | 5/1994 | Hendel et al. . |
| 5,357,506 | 10/1994 | Sugawara . |
| 5,365,522 | 11/1994 | Peeters . |
| 5,384,773 | 1/1995 | Olnowich et al. . |
| 5,390,184 | 2/1995 | Morris . |
| 5,418,779 | 5/1995 | Yemini et al. . |
| 5,436,894 | 7/1995 | Wallmeier et al. . |
| 5,610,745 | 3/1997 | Bennet ............................... 370/232 |

OTHER PUBLICATIONS

Kumar Malavalli & Bent Stoevhase; "Distributed Computing With Fibre Channel Fabric", Canstar, 3900 Victoria Park Ave., N.York, Ontario, Canada; Publication Date :Feb. 24, 1992, Institute of Electrical and Electronics Engineers, Inc.—Digest of Papers—Spring Compcon 92.

*Primary Examiner*—Chau Nguyen
*Attorney, Agent, or Firm*—William J. Kubida, Esq.; Stuart T. Langley, Esq.; Holland & Hart LLP

[57] ABSTRACT

A method and apparatus for removing a virtual connection between first and second devices in a communication system that includes at least one switch virtually connecting the first and second devices. An error in the virtual connection can be detected in at least one of the first and second devices and the at least one switch, with the detector transmitting a request to remove the virtual connection. The virtual connection then is removed from the communication system in response to the transmission of the request. The request to remove the virtual circuit may be in the form of an information frame transmitted over the virtual connection, with each system component being removed from the virtual circuit upon its processing of the information frame. Additionally, a method and apparatus for operating the virtual connection between the first and second devices. The virtual connection includes a live state in which information frames are transmitted between the first and second devices over the virtual connection at a minimum guaranteed bandwidth. The virtual connection further includes a dormant state wherein information frames are not transmitted over the virtual connection and the bandwidth guaranteed to the connection is made available to other connections in the system.

29 Claims, 5 Drawing Sheets

METHOD AND APPARATUS FOR IMPLEMENTING VIRTUAL CIRCUITS IN A FIBRE CHANNEL SYSTEM

FIELD OF THE INVENTION

This invention relates to a method and apparatus for implementing virtual circuits within a fibre channel system.

BACKGROUND DISCUSSION

Computers and computer peripherals (collectively "devices") generally include at least one input/output (I/O) channel that allows communication with other devices. Traditional I/O channels support only a single protocol (e.g., SCSI, IPI, proprietary protocols, etc.). Thus, to provide a computer or peripheral with the ability to communicate with other devices using multiple protocols, multiple I/O channels were traditionally required, each having hardware to support its associated protocol. Often, the hardware necessary to support even a single protocol can be significant in terms of both cost and physical space. Thus, the use of multiple I/O channels is disadvantageous.

Fibre Channel is a computer-to-peripheral or computer-to-computer multi-protocol networked I/O channel that has been proposed to overcome the disadvantages associated with using multiple single-protocol I/O channels. An interface standard for Fibre Channel has been adopted by the American National Standard for Information Systems (ANSI), and is set forth in an ANSI standard document entitled FIBRE CHANNEL-PHYSICAL AND SIGNALLING INTERFACE, X3.230-1994 (hereafter "FC-PH"), which is incorporated herein by reference. A supplement to FC-PH has been proposed, and a working draft is entitled FIBRE CHANNEL-PHYSICAL AND SIGNALLING INTERFACE-2, rev. 6.0, Mar. 29, 1995 (hereafter "FC-PH-2"), which is also incorporated herein by reference. Fibre Channel specifies a variety of communication protocols, data rates and physical media interface types (e.g., optical, coaxial, twisted pair wires) to meet the needs of peripheral and computing devices in their support of multiple I/O protocols.

Fibre Channel supports a number of different topologies, each defining the manner in which a system of devices can be networked together. These topologies include, for example, direct one-to-one connection between two devices, a loop topology, and a fabric topology. A fabric is a network of switches for interconnecting a plurality of devices without restriction as to the manner in which the switches can be arranged, and can include a mixture of other topology types.

Because Fibre Channel sought to support multiple communication protocols and a fabric topology, problems were encountered that had not been faced with conventional networks and I/O channels. Fibre Channel allows the interconnection of multiple switches, each potentially supporting multiple protocols, in an unrestricted fashion in a single system. Thus, the potential exists in Fibre Channel for two or more devices to be connected to the same system, despite the fact that they cannot communicate because they are incompatible. For example, two devices may be incompatible because they cannot support a common data rate or data frame size for communicating therebetween. Thus, a technique was developed for determining which switches and devices could communicate with one another in a Fibre Channel system, and which could not. Furthermore, a technique was also developed for determining what service parameters would be used by the switches and devices in any system that were compatible, to ensure that each used common service parameters during inter-device communication. A technique for accomplishing these tasks is described in co-pending U.S. patent application Ser. No. 08/336,396, filed Nov. 8, 1994, and entitled "METHOD AND APPARATUS FOR CONFIGURING FABRICS WITHIN A FIBRE CHANNEL SYSTEM", which is hereby incorporated herein by reference.

Fibre Channel supports five different service classes that can be employed to communicate between devices and/or switches in a system, i.e., service classes 1–4 and F. Service classes 1–3 are defined in detail in the FC-PH document that establishes the Fibre Channel standard, along with features that are common to each service class. Service class 4 is defined in detail in the FC-PH-2 document, along with additional proposed features common to all service classes and some specifically directed to class 1. Briefly, service class 1 establishes a dedicated connection between two devices, and the connection is retained and guaranteed by the fabric. Service class 2 is a connectionless service with the fabric multiplexing frames at frame boundaries. The device provides acknowledgment of delivery, or the fabric provides notification of failure to deliver transmitted frames. Service class 3 is also a connectionless service with the fabric multiplexing frames at frame boundaries, but supports only unacknowledged delivery. Service class 4 establishes a connection including a pair of unidirectional virtual circuits between two devices, and the virtual circuits are retained and guaranteed by the fabric. In class 4, the fabric maintains a lossless communication channel between the two devices and a minimum guaranteed bandwidth, while making unused bandwidth available for use by other connections in the Fibre Channel system. As used herein, the term bandwidth indicates channel capacity. Service class F is a connectionless service that is restricted to use only by fabric elements (i.e., switches) when communicating with each other.

The present invention is directed to a method and apparatus for implementing virtual circuits that satisfy the class 4 requirement of guaranteeing minimum bandwidth and providing a lossless communication channel, while making unused bandwidth available for use by other circuits.

The present invention is further directed to a method and apparatus for removing virtual circuits in a Fibre Channel system when an error is detected.

SUMMARY OF THE INVENTION

In one illustrative embodiment of the invention, a method is provided for removing a virtual connection between first and second devices in a system, the system including at least one switch virtually connecting the first and second devices. The method comprises steps of (A) detecting in at least one of the first and second devices and the at least one switch an error in the virtual connection; (B) transmitting a request to remove the virtual connection from the at least one of the first and second devices and the at least one switch in which the error is detected; and (C) removing the virtual connection in response to transmission of the request.

In another illustrative embodiment of the invention, an apparatus is provided for being disposed in a system having a plurality of interconnected components. The apparatus comprises means for establishing a virtual connection between the apparatus and at least one of the plurality of interconnected components; detecting means for detecting an error in the virtual connection; and removal means, responsive to the detecting means, for removing the virtual connection from the system when the error is detected.

In another illustrative embodiment of the invention, a method is provided for removing a virtual connection established between first and second devices in a system, the system including at least one switch virtually connecting the first and second devices. The method comprises steps of (A) transmitting an information frame over the virtual connection requesting that the virtual connection be removed; (B) removing at least one of the first and second devices and the at least one switch from the virtual connection upon receipt of the information frame at the one of the first and second devices and the at least one switch.

In another illustrative embodiment of the invention, a method is provided for operating a virtual connection between first and second devices in a system, the system including at least one switch virtually connecting the first and second devices. The method comprises steps of: (A) establishing the virtual connection between the first and second devices; (B) entering a live state of the virtual connection; (C) transmitting information frames over the virtual connection between the first and second devices in the live state; and (D) transitioning the virtual connection from the live state to a dormant state wherein no information frames are transmitted between the first and second devices over the virtual connection.

In a further illustrative embodiment of the invention, an apparatus is provided in a component for being disposed in a system including at least one other component. The apparatus comprises means for establishing a virtual connection through the system between the component and the at least one other component; receiving means for receiving information frames transmitted over the virtual connection from the at least one other component; transmitting means for transmitting information frames over the virtual connection from the component to the at least one other component; and a state machine, coupled to the transmitting means, that controls use of the virtual connection by the component, the state machine defining a live state of the virtual connection wherein a minimum bandwidth is guaranteed for transmission of information frames between the component and the at least one other component over the virtual connection, the state machine further defining a dormant state of the virtual connection wherein the minimum bandwidth is not guaranteed for the transmission of information frames between the component and the at least one other component over the virtual connection.

DETAILED DESCRIPTION OF ILLUSTRATIVE EMBODIMENTS

Figure 1:
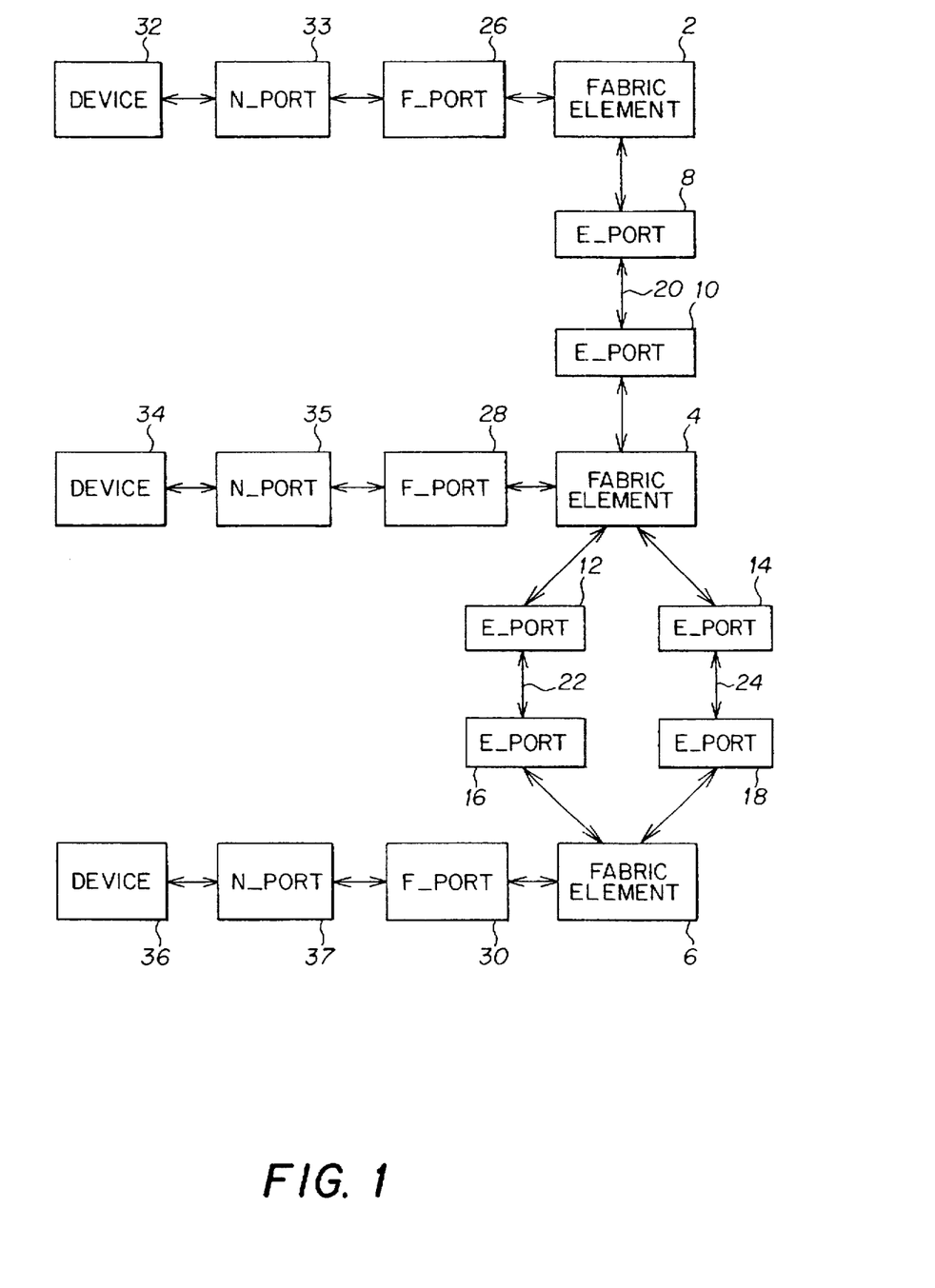
FIG. 1 is a block diagram of an example of a Fibre Channel system.

FIG. 1 shows an example of a Fibre Channel system that includes three fabric elements 2, 4 and 6. Each fabric element is associated with a plurality of ports, and together therewith forms a switch that internally connects the ports, such that data into one port of the switch can be output from any of the other ports. Each of the fabric elements 2, 4 and 6 is shown with at least one associated E_Port and F_Port. In particular, fabric element 2 has an associated E_Port 8, fabric element 4 has associated E_Ports 10, 12 and 14, and fabric element 6 has associated E_Ports 16 and 18. An E_Port is a label used to identify a port of a fabric element that is used to form a connection with another fabric element. The connection between two E_Ports is established via an inter-element link (IEL). In FIG. 1, E_Ports 8 and 10 are connected via IEL 20, E_Ports 12 and 16 are connected via IEL 22, and E_Ports 14 and 18 are connected via IEL 24. Each IEL supports only one of the Fibre Channel data rates.

In the example illustrated in FIG. 1, fabric elements 2, 4 and 6 respectively have associated F_Ports 26, 28 and 30. An F_Port is a label used to identify a port of a fabric element that is used to form a connection with a device, such as a computer or peripheral. In FIG. 1, F_Ports 26, 28 and 30 are respectively coupled to devices 32, 34 and 36 through N_Ports 33, 35 and 37. An N_Port is a label used to identify a port of a device that is used to form a connection with a fabric element.

Of the service classes supported by Fibre Channel, each of service classes 1, 2 and 4 provides a lossless communication channel, wherein every frame transferred from a source is guaranteed to arrive at its destination, or the fabric provides notification of failure to deliver transmitted frames. The notification of delivery failure is provided only in connection with class 2 frames and class 1 connection frames (i.e., frames transmitted requesting the formation of a class 1 connection), because delivery of all class 4 frames and all other class one frames is guaranteed. The lossless feature is to be contrasted with other types of communication channels wherein a specified amount of bandwidth may be available to a device on a statistical basis, but is not guaranteed and can result in the potential loss of information frames. The lossless feature of Fibre Channel is accomplished at the expense of reserving sufficient bandwidth to ensure that all guaranteed bandwidths can be satisfied, resulting in the potential wasting of unused bandwidth. An objective of service class 4 is to make such unused bandwidth available to other connections, while ensuring that minimum bandwidth guarantees are satisfied for each class 4 connection.

A class 4 connection can be established between any two devices based upon a request from the N_Port associated with either device. A class 4 connection between two N_Ports is implemented as a pair of two counter-directional virtual circuits between the N_Ports. Each of the two virtual circuits is formed through the same chain of fabric elements (i.e., switches) and links. For example, a class 4 connection formed between devices 32 and 36 of FIG. 1 could include two virtual circuits formed through fabric elements 2, 4 and 6 and IELs 20 and 22. Each class 4 connection is implemented as two separate virtual circuits so that the connection can make bandwidth unused in either direction available as discussed further below.

Any N_Port in a Fibre Channel system can request or accept the concurrent establishment of multiple concurrent class 4 connections with different N_Ports. Furthermore, although it is expected that generally only a single class 4 connection will be formed between two N_Ports, Fibre Channel is not limited in this respect, and provides the capability of establishing multiple class 4 connections between a single pair of N_Ports. An N_Port that forms part of a class 4 connection can also transmit and receive frames in either of service classes 2 and 3 while the class 4 connection exists. The only restriction in this respect is that an N_Port cannot implement class 1 and class 4 connections simultaneously, because class 1 is a dedicated connection between two devices.

Multiple class 4 connections can share the same inter-element link. For example, in addition to the formation of the class 4 connection described above between devices 32 and 36, another class 4 connection can concurrently be established between devices 32 and 34 that shares fabric elements (i.e., switches) 2 and 4, as well as IEL 20. As stated above, additional connections in any of classes 2–4 may also be simultaneously established with either of the N_Ports 33 and 35 that are respectively associated with devices 32 and 34. When the class 4 connection is formed between devices 32 and 34, a minimum guaranteed bandwidth is established for the connection, ensuring that devices 32 and 34 can communicate using at least the minimum guaranteed bandwidth. If additional bandwidth becomes available, for example if the class 4 connection between devices 32 and 36 is not actively being used, devices 32 and 36 can communicate using this additional available bandwidth over the class 4 connection formed between them.

As stated above, a class 4 connection is established based upon a request by an N_Port. The request defines a number of quality of service (QoS) parameters that must be guaranteed for the class 4 connection to be established, and identifies a destination N_Port to which the connection is requested. The quality of service parameters include the minimum bandwidth that the requesting N_Port requires for the class 4 connection, a maximum size to be used in transferring information across the connection, and a maximum one-way latency period established independently for each of the two virtual circuits that make up the class 4 connection.

Each Fibre Channel system includes a quality of service facilitator (QoS facilitator), implemented in software, that handles requests to establish class 4 connections. The QoS facilitator can reside at a single known address where it can receive all requests to establish class 4 connections, or it can be distributed among the switches (i.e., in the fabric element E_Ports and F_Ports) in the system. When the facilitator function is distributed, each switch includes a corresponding QoS facilitator. An N_Port that seeks to establish a class 4 connection sends a request with the desired QoS parameters to the QoS facilitator of its associated fabric element F_Port. For example, N_Port 37 would send such a request to the QoS facilitator of F_Port 30. Each fabric element has sufficient information to determine a path through the Fibre Channel system from the requesting N_Port to any destination N_Port. Thus, the QoS facilitator of the fabric element port associated with the requesting N_Port is responsible for selecting a path through the fabric for establishing the requested class 4 connection.

The determination of whether the fabric can support the QoS parameters of the requested class 4 connection can be performed in one of two ways. First, the QoS facilitator of the fabric element associated with the requesting N_Port can serve as a request manager and query each of the switches (fabric elements) that would participate in the connection and the destination N_Port to ensure that each can support the requested QoS parameters. Second, the QoS facilitator that receives the request can modify the request and then pass it along to the next switch or the destination N_Port so that each switch and N_Port that would participate in the class 4 connection can dynamically take part in the process of determining whether the request can be granted.

The manner in which the fabric determines whether it can satisfy the QoS service parameters varies for each parameter.

A maximum and minimum supported frame size for each fabric element and node is established when the Fibre Channel system is configured, in the manner described in the specification of U.S. patent application Ser. No. 08/336,396. Thus, each fabric element (i.e., switch) and N_Port that would form a portion of the requested class 4 connection can determine whether it supports the requested frame size, and will cause the request for the establishment of the class 4 connection to be rejected if the requested frame size is not supported. Similarly, each can also determine whether it supports the minimum guaranteed bandwidth and will reject the request if it cannot support the requested bandwidth.

The determination of whether the fabric can support the other QoS parameter (i.e., maximum one-way latency) involves an evaluation of the path through the fabric as a whole, rather than evaluating each fabric element and N_Port individually. As discussed above, the determination for this parameter can be done in one of two ways. First, the QoS facilitator in the fabric element associated with the requesting N_Port can query each of the fabric elements in the path to the destination N_Port and accumulate information on the latency period for a frame passing through each. In this manner, the single Qos facilitator can act as a manager to make the determination of whether the class 4 connection can be formed with the requested one-way latency period. Second, each fabric element in the path between the source and destination N_Ports can participate dynamically in the process. For example, the QoS facilitator in the fabric element associated with the requesting N_Port can subtract from the requested minimum latency period the latency time from the requesting N_Port through that fabric element, and then pass along the remaining latency time to the next fabric element. The remaining fabric elements will similarly subtract the latency period through their switch and pass along the revised latency period to the next fabric element. If additional latency remains by the time the information is presented to the destination N_Port, it is ensured that the requested circuit can satisfy the minimum latency period required for the requested connection.

If a request to establish a class 4 connection is initially attempted through a first path through the fabric but fails, the QoS facilitator may try other paths to determine whether any of those can satisfy the request. However, a limit may be placed on the number of unsuccessful attempts so that an excessive amount of time is not wasted in attempting every possible path before determining that the requested class 4 connection cannot be established.

In addition to the quality of service parameters specified above, each requesting N_Port also assigns a virtual circuit identifier (VC_ID) as part of the process for establishing a class 4 connection. The VC_ID is then used for routing all class 4 frames over the virtual circuit.

To guarantee the minimum bandwidth requested for each class 4 connection while making unused bandwidth available to other connections, frame flow through each class 4 connection is controlled both at the link level and the end-to-end level. Each N_Port and fabric element includes buffers for storing received information frames. Frame flow control at the link level ensures that a frame is not transferred to a fabric element from an N_Port or another fabric element unless the receiving fabric element has a buffer available to receive the frame. Flow control at the end-to-end level ensures that frames are not transmitted from the source N_Port unless the destination N_Port has a buffer available to receive the frame.

Frame flow at the buffer-to-buffer (i.e., link) level is controlled through the establishment of a buffer-to-buffer credit reserve (BB_Credit reserve) between each adjacent pair of fabric elements over an IEL, and between each fabric element and its associated N_Port. The BB_Credit reserve is maintained separately for the two virtual circuits that implement a class 4 connection, and initially is based upon the minimum bandwidth guaranteed by the class 4 connection. Thereafter, when a port or switch (i.e., a fabric element) transmits a frame over a link, the transmission consumes one BB_Credit for the virtual circuit over that link. Conversely, when a switch or N_Port associated with a class 4 connection has a buffer available to receive a frame, it transmits a virtual circuit ready (VC_RDY) signal to its adjacent fabric element, indicating that a buffer is available to receive a frame. Each VC_RDY signal uniquely identifies one of the virtual circuits of the class 4 connection to which it belongs, and is a special data pattern transferred over the link. When a VC_RDY signal is received at an N_Port or a fabric element, one BB_Credit relating the corresponding virtual circuit is restored to the N_Port or fabric element that receives the signal. Thus, at the link level, an N_Port or frame element consumes one BB_Credit each time it transfers a frame, and one credit is restored when a VC_RDY signal is received indicating that a buffer is available on the other side of the link to receive another frame.

A receiving N_Port will not refuse to accept a frame transmitted over a class 4 connection. Therefore, once a frame arrives at the fabric element adjacent the destination N_Port, it can be transferred directly to the N_Port without awaiting a VC_RDY signal. The destination N_Port may have some bandwidth limitation relating to the rate at which it can process received frames. The frame flow control at the end-to-end level ensures that frames do not arrive at the destination N_Port at a rate which exceeds its capacity for processing received frames.

The end-to-end frame flow is controlled in a manner that is somewhat analogous to the buffer-to-buffer flow control described above. An end-to-end flow control credit reserve (EE_Credit reserve) is established for each of the virtual circuits of a class 4 connection. When an N_Port transmits a frame over a virtual circuit, it consumes one credit of the corresponding EE_Credit reserve. When a destination N_Port has the resources available to receive a frame, it sources an acknowledge (ACK) frame over the class 4 connection to the source N_Port, which restores one credit to the EE_Credit reserve associated with the virtual circuit. The ACK frame is sent over the other of the virtual circuit pairs that form the class 4 connection.

As discussed above, an N_Port cannot transmit a frame on a class 4 connection unless it has both EE_Credit and BB_Credit. Conversely, a switch can always send class 4 frames to an N_Port without credit restrictions, and can transmit frames to another switch only if it has BB_Credit.

It should be appreciated from the foregoing that the establishment of the EE_Credit and BB_Credit reserves, as well as the corresponding ACK frames and VC_RDY signals for restoring credits to those reserves, ensures that each class 4 connection can satisfy its minimum guaranteed bandwidth, and guarantees that no data frames will be lost at a switch (fabric element) or destination N_Port. By controlling the VC_RDY primitive signal and the ACK frames, switches and N_Ports can ensure that they do not receive more frames that they can process, ensuring that no frames are lost.

Figure 2:
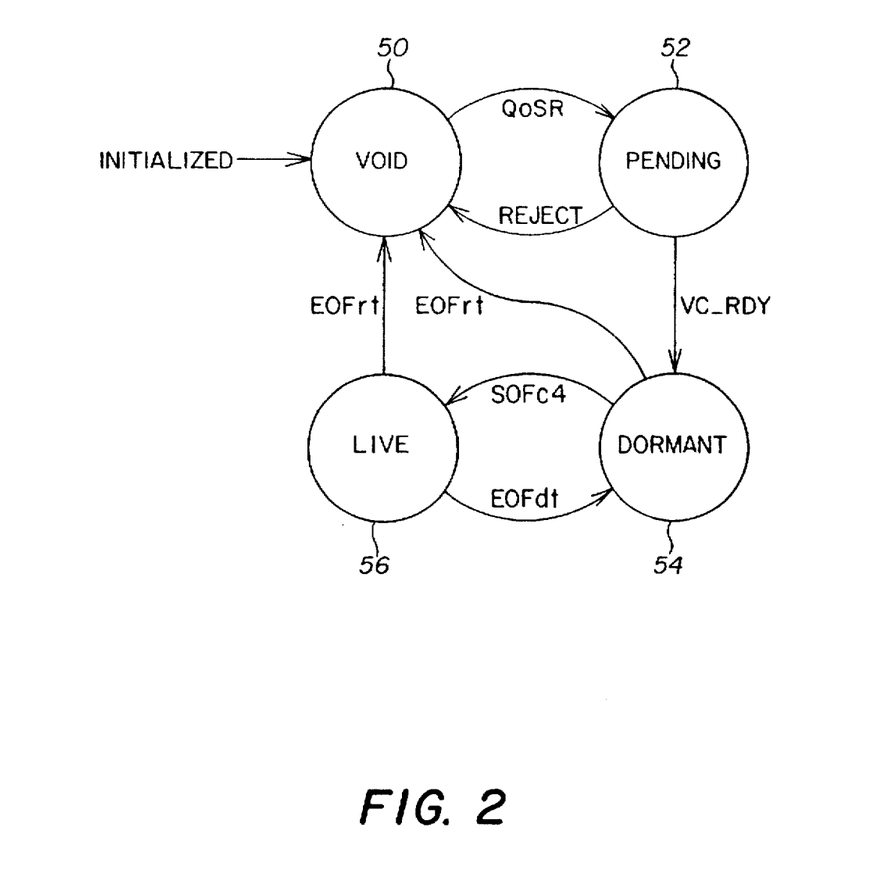
FIG. 2 is a state diagram illustrating an embodiment of the class 4 connection state machines according to the present invention.

To implement the class 4 connections which guarantee a minimum established bandwidth while making unused bandwidth available, the present invention provides a method and apparatus for establishing multiple class 4 connection states within each Fibre Channel component. As used herein, the term component is intended to include both computers and computer peripherals (i.e., devices) and fabric elements (i.e., switches). Thus, a state machine is established in each N_Port and fabric element port that participates in a class 4 connection to keep separate state information for each class 4 connection supported by the port. A state diagram of the class 4 connection state machine is shown in FIG. 2.

When the system is initialized, the state machine for each port enters a void state 50 indicating that no class 4 connection exists for the port. As discussed above, the first step in forming a class 4 connection is that a source N_Port issues a quality of service request (QoSR) requesting that a class 4 connection be established according to QoS parameters specified in the request. The QoSR is a special information frame that is sourced to the QoS facilitator for the fabric in the manner described above.

Whenever a QoSR is sent or received by the port associated with the state machine, the state machine transitions from the void state to a pending state 52. As discussed above, when a class 4 QoSR is sent by an N_Port, the appropriate fabric elements and destination N_Port examine the QoS parameters specified in the request to determine whether they can be satisfied. This examination is performed in the pending state. If the fabric elements and destination N_Port that would implement the requested class 4 connection cannot satisfy the QoSR parameters, a reject frame is sent to the N_Port that issued the QoSR. The reject frame passes through the same path through the fabric as the QoSR. When the state machine for any port issues or receives a reject frame, it returns to state 50 so that no class 4 connection is established in response to the QoSR.

When a request to establish a class 4 connection is accepted, the state machine for each port enters a dormant state 54. Thus, the pending state 52 is merely a transitional state entered in response to a QoSR and exited once the request is accepted or rejected. It should be understood that the set-up process for requesting a class 4 connection can be performed using any of classes 1-4.

The specific timing of the state machine transition from the pending state 52 to the dormant state 54 in response to the assertion of the VC_RDY signal is dependent upon the type of port with which the state machine is associated. State machines associated with an F_Port of a fabric element (i.e., switch) transition from the pending to the dormant state when the F_Port sends its first VC_RDY signal. State machines associated with E_Ports transition from the pending to the dormant state when the E_Port either transmits or receives a VC_RDY signal. Finally, state machines associated with an N_Port transition from the pending to the dormant state when they receive a VC_RDY signal.

In the embodiment shown in FIG. 2, the state machine transitions from the pending state 52 to the dormant state 54 when the associated port sends or receives the VC_RDY signal for reasons that are discussed below. However, it should be understood that the present invention is not limited in this respect, and that various other techniques for transitioning from the pending to the dormant state can be implemented. All that is required is that the state machine be provided with some indication that the QoSR has been accepted and that the class 4 connection has been established.

Fabric elements (switches) and their associated F_Ports and E_Ports are provided with a number of resources to support class 4 connections. As discussed above, each fabric element and its associated ports includes buffers for storing frames received from an N_Port or another fabric element. In addition, each fabric element includes a bandwidth monitor, a pacer for generating the VC_RDY signal, a header validator, and the class 4 connection state machine described above. The bandwidth monitors monitor the bandwidth being allocated to a class 4 connection, and work in conjunction with the pacers to determine when a VC_RDY signal should be generated for a virtual circuit to ensure that the minimum bandwidth guaranteed for the connection is met. Thus, if the bandwidth monitor detects that the bandwidth being used by a virtual circuit is in danger of falling below the minimum guaranteed bandwidth, the bandwidth monitor signals the pacer to generate as many VC_RDY signals as is required to provide sufficient buffer-to-buffer credit to ensure that the minimum guaranteed bandwidth is maintained.

As is discussed more fully below, whenever a frame is transferred over a class 4 connection, the frame includes a virtual circuit identifier (VC_ID) identifying the virtual circuit, as well as identification fields for the source N_Port and the destination N_Port. The header validators in each compare this set of three identifiers in each frame to ensure that it accurately describes an existing class 4 connection, and the output of the validators is used in an error detection scheme discussed below.

The N_Ports in a class 4 connection also provide similar resources for supporting class 4 connections, including frame buffers, header validators and class 4 connection state machines, which operate in a similar manner.

In both the void state 50 and the pending state 52, the buffer-to-buffer credit reserve is set to zero, indicating that the associated port cannot transfer any frames over the class 4 connection. When the state connection machine transitions from the pending state to the dormant state 54, it is desirable to increment the BB_Credit reserve by one for reasons discussed below. Thus, in the embodiment illustrated in FIG. 2, the assertion of the VC_RDY signal is used to transition from the pending to the dormant state because the assertion of this signal has the desired affect of causing the BB_Credit reserve for the port to be incremented by one.

From the dormant state, the class 4 connection state machine enters a live state 56 when a start of frame connect class 4 (SOFc4) data frame is transmitted by one of the N_Ports for the class 4 connection. The SOFc4 frame is sent by either N_Port when it desires to begin active use of the established class 4 connection. The class 4 connection state machines for N_Ports transition from the dormant state 54 to the live state 56 whenever they transmit or receive an SOFc4. The connection state machines for E_Ports and F_Ports transition from the dormant to the live state whenever they receive an SOFc4 from one of the N_Ports associated with the class 4 connection.

As should be appreciated from the foregoing, in the embodiment illustrated in FIG. 2, the N_Port class 4 connection state machines transmit a single information frame (i.e., SOFc4) to re-activate a dormant class 4 connection. Thus, the BB_Credit reserve is set to one in the dormant state to enable the N_Ports to transmit this frame. However, by limiting the BB_Credit reserve to one, it is ensured that no other information frames can be transmitted until the N_Port enters the live state 56 and builds up the BB_Credit reserve.

Once the class 4 connection state machine has entered the live state 56, the BB_Credit reserve is no longer fixed at one, and becomes variable. Upon receipt of VC_RDY signals from the neighboring port, the BB_Credit reserve is incremented, but cannot exceed a maximum BB_Credit limit for the port. Thus, once the connection state machine enters the live state, the value of the BB_Credit reserve is incremented each time a VC_RDY signal is received up to the credit limit, and is decremented each time a frame is transmitted. Thus, through the use of the bandwidth monitors and pacers, the class 4 connection ensures that the minimum guaranteed bandwidth is provided to the class 4 connection.

As mentioned above, each port in a class 4 connection is provided with a maximum BB_Credit limit which limits the number of BB_Credits that can be built up for the port at any one time. If the maximum BB_Credit limit was not established, every time the receiving port issued a VC_RDY signal, the BB_Credit reserve would be increased, providing the potential for the credit reserve to reach a very high number. The BB_Credit reserve and the VC_RDY signal are the only means by which buffer-to-buffer flow is controlled. Thus, a port is free to source frames in an unrestricted manner so long as it has BB_Credits remaining. Therefore, if there were no limit placed on the maximum number of BB_Credits that could be built up, a port could potentially accumulate a massive amount of BB_Credit, such that if it transferred frames to its neighboring port to the full extent allowed by the credit reserve, it could exceed the capacity of the receiving port, resulting in frames being lost. Therefore, the maximum BB_Credit limit is used to ensure that no data frames are lost.

Once a class 4 connection has been established and the connection state machine is in either the dormant state 54 or the live state 56, the connection can be removed by any port transmitting an end of frame remove terminate (EOFrt) data frame over the connection. Whenever any port transmits or receives an EOFrt, it removes the class 4 connection by transitioning to the void state 50, wherein it has a BB_Credit reserve of zero and therefore cannot transmit any frames over the class 4 connection.

After a class 4 connection has been established between two N_Ports, either N_Port can also temporarily suspend the use of the class 4 connection by sending an end of frame deactivate terminate (EOFdt) data frame over the connection. Whenever an EOFdt data frame is transmitted or received by a port, its corresponding class 4 connection state machine transitions from the live state 56 to the dormant state 54 (FIG. 2). Once the dormant state is entered, the BB_Credit reserve for each port in the connection is again set to one. As a result, the class 4 connection will at least temporarily not make full use of the bandwidth guaranteed for the connection, thereby making the unused bandwidth available for other connections.

Either N_Port in a class 4 connection can cause the connection to become dormant. Once the circuit becomes dormant, bandwidth and frame buffers are borrowed from the dormant connection and can be used by other virtual circuits. When either N_Port desires to re-activate the dormant connection, it sends the SOFc4 signal, which causes the ports in the virtual connection to re-enter the live state. Thereafter, the borrowed frame buffers are again allocated to the newly activated connection through the transmission of the VC_RDY signals as the buffers become available.

It should be understood that when a port participating in a virtual circuit transitions from the dormant state to the live state, the BE_Credit reserve for the port will be equal to one, and will only be built up by the assertion of the VC_RDY signal as buffers become available. Thus, the virtual circuit may not instantaneously be able to operate at its guaranteed minimum bandwidth and will incur a re-activation penalty. This re-activation penalty is significantly less than that which would be incurred to initially establish a new class 4 connection. Furthermore, entering the dormant state is within the control of the N_Ports of the class 4 connection. Therefore, if an N_Port is unwilling to pay this re-activation penalty for transitioning from the dormant state to the live state, the N_Port will simply not allow the class 4 connection to enter the dormant state.

As should appreciated from the foregoing, the provision of two states (i.e., the live and dormant states) for each established virtual circuit makes it possible for the fabric elements and ports to allow excess bandwidth allocated to dormant virtual circuits to be used by other actively used (i.e., live) virtual circuits. This provides a significant advantage over conventional systems which either waste unused bandwidth by not making it available, or provide only a statistical guarantee against frame loss.

Figure 3A:
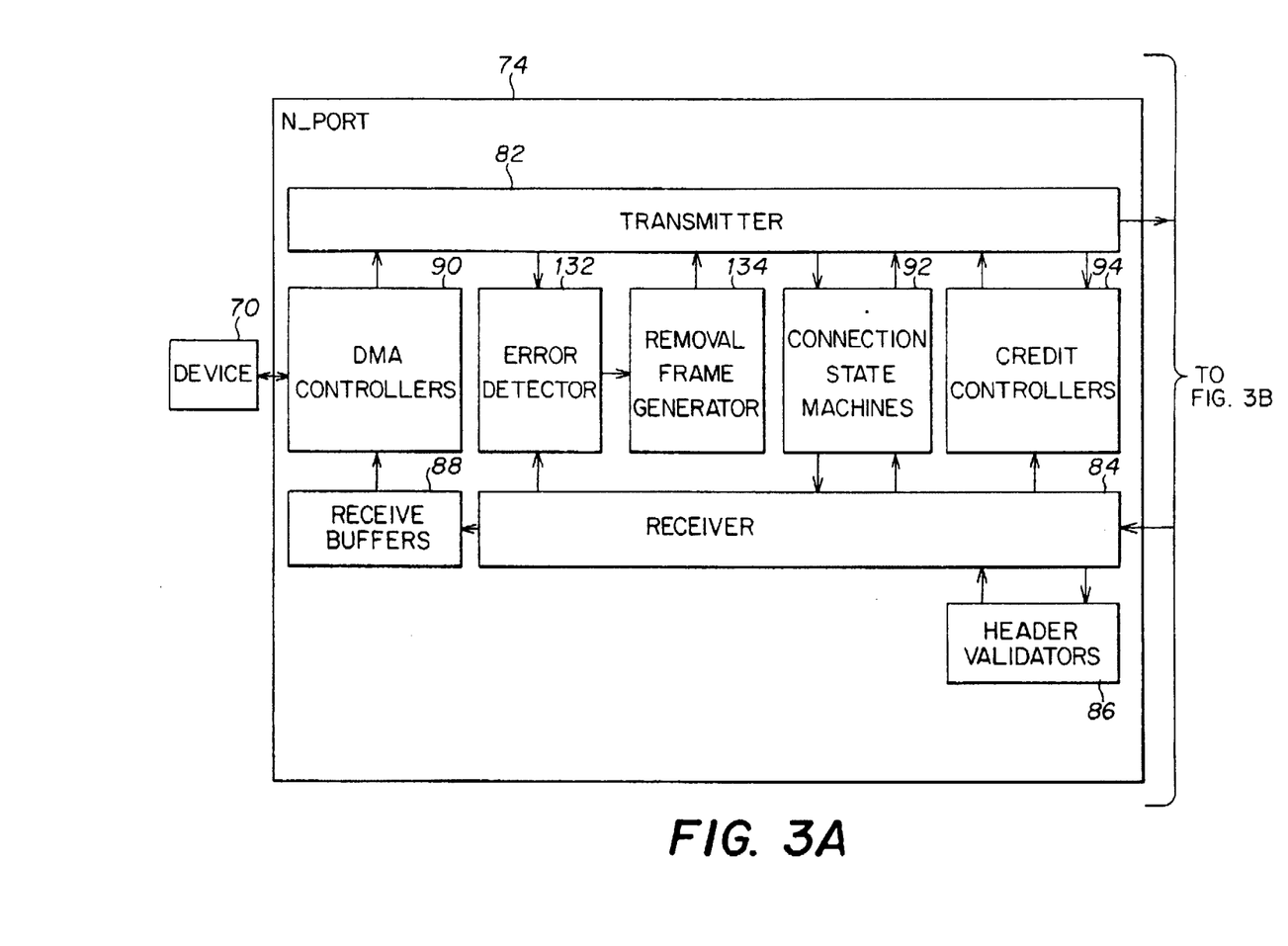
FIG. 3 is a block diagram showing the port resources used to support class 4 connections.
Figure 3B:
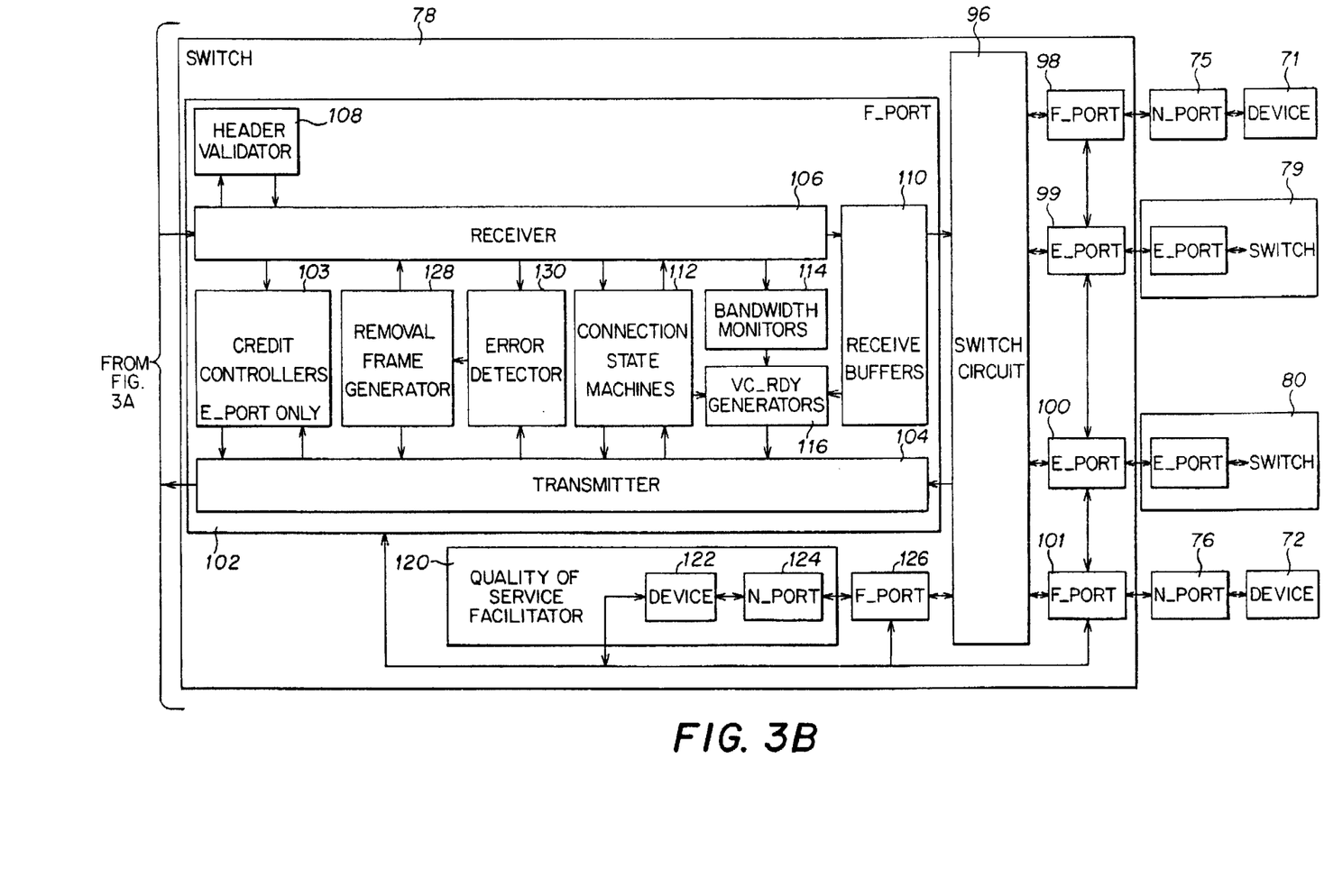

FIG. 3 is a block diagram of a Fibre Channel system showing the resources provided in the N_Ports, E_Ports and F_Ports to support class 4 connections. The Fibre Channel system shown in FIG. 3 includes three devices 70–72 and corresponding N_Ports 74–76. The Fibre Channel system also includes three switches (i.e., fabric elements and their associated ports) 78–80. The structures of N_Port 74 and switch 78 are shown in detail in FIG. 3. The other N_Ports and switches are implemented in the same manner, but are not shown in FIG. 3 for the sake of convenience.

N_Port 74 includes a transmitter 82 and a receiver 84 for respectively transmitting and receiving information frames to/from switch 78. A header validator 86 examines the header of each information frame received by receiver 84 to determine whether it identifies a circuit supported by N_Port 74, as discussed further below. Information frames received from switch 78 are passed from receiver 84 to a set of receive buffers 88 which store the frames. A direct memory access (DMA) controller 90 provides direct access to memory (not shown) of device 70, so that information frames can be transferred directly from the device memory to transmitter 82 and from the receive buffers 88 to the device memory. Connection state machines 92 are coupled to the transmitter 82 and receiver 84 for controlling operation of the virtual connections supported by N_Port 74 in the manner discussed above. Similarly, credit controllers 94 maintain the BB_Credit and EE_Credit reserves for each virtual circuit supported by N_Port 74. The credit controllers receive VC_RDY signals and ACK frames from the switch 78 through receiver 84, as well as signals from transmitter 82 indicating when an information frame is transmitted to switch 78, so that the credit reserves can be maintained in the manner discussed above.

Switch 78 includes a switch circuit 96, as well as a plurality of ports (F_Ports and E_Ports) 98–102. Each of the ports of switch 78 includes a substantially similar structure, but only port 102 is shown in detail for the sake of convenience. The switch circuit 96 internally connects each of the switch ports, such that data into one port of switch 78 can be output from any of the other ports. The port 102 includes a transmitter 104 and a receiver 106 for respectively transmitting frames to and receiving frames from N_Port 74. A header validator 108 serves the same function as validator 86 in N_Port 74, i.e., ensuring that information frames received by port 102 are related to a circuit supported by the port. A set of receive buffers 110 stores information frames received by receiver 106 from N_Port 74 until they are ready to be transmitted from the switch using one of the other ports 98–101. The transmission of information frames from the switch through one of the other ports is controlled by a transmitter 104 in the other port, and can only be accomplished when that other port has BB_Credit as discussed above.

As with N_Port 74, the connection state machines 112 are disposed between the transmitter 104 and receiver 106. The port 102 also includes bandwidth monitors 114 and VC_RDY generators 116 which perform the functions discussed above. The bandwidth monitors are coupled to the receiver 106 to monitor the bandwidth of frames being received from N_Port 74, and this information is passed to VC_RDY generators 116 along with information from the receive buffers 110 indicating how many of the buffers are available and how many are in use by the virtual circuit. The VC_RDY generators use this information to control the assertion of VC_RDY signals to ensure that N_Port 74 has sufficient BB_Credit to satisfy the minimum bandwidth guaranteed for its established class 4 connections.

One difference in structure between E_Ports and F_Ports is that E_Ports further include credit controllers 103, disposed between the transmitter 104 and receiver 106, which perform the same function as the credit controllers 94 in N_Port 74. Although port 102 is an F_Port, credit controller 103 is shown in FIG. 3 to demonstrate the structure of the E_Ports. As stated above, N_Ports cannot refuse the transmission of information frames over a class 4 connection. Thus, F_Ports do not require a credit controller to control the transmitting of information frames over the link with an N_Port. However, since E_Ports are linked to the E_Ports of other switches over an IEL, each E_Port includes credit controllers 103 to ensure that no information frames are transferred across an IEL unless the transmitting E_Port has BE_Credit.

FIG. 3 illustrates the embodiment of the invention wherein the QoS facilitator is distributed among the switches in the Fibre Channel system. Thus, switch 78 includes a QoS facilitator 120, and every other switch includes a similar facilitator. The QoS facilitator includes a device 122 connected to the Fibre Channel system that will be assigned a system address at which the QoS facilitator can receive requests to form and remove class 4 connections. The device 122 has an associated N_Port 124, which is coupled to the switch structure 96 through a corresponding F_Port 126. The device 122 may be any device that includes a processor capable of running a software program to implement the QoS facilitator to perform the functions described above.

In addition to being coupled to the switch structure 96 to receive class 4 connection requests, device 122 is also coupled directly to each of the switch ports 98–101 and 120. This direct connection enables the QoS facilitator for each switch to initialize the switch's hardware resources that support class 4 connections when a class 4 connection that includes the switch is established or removed from the system. For example, when a class 4 connection is established, the QoS facilitator initializes the header validator in each of the switch ports so that each will recognize frames having the established header as being valid class 4 frames.

As discussed above, each virtual circuit that forms part of a class 4 connection is uniquely identified with a virtual circuit identifier (VC_ID). In addition, when a class 4 connection is formed, in addition to the QoS parameters that are established, unique identifiers are established for the source and destination N_Ports of both virtual circuits of the connection. Thus, for each class 4 connection, two VC_IDs are created, as well as identifiers for two sources (S_IDs) and two destinations (D_IDs). The destination and source identifiers for each N_Port can be any unique identifier, and are not restricted to the address assigned to the N_Port by the Fibre Channel system.

Whenever a frame is transmitted over one of the virtual circuits of a class 4 connection, the frame includes the VC_ID, S_ID and D_ID that uniquely identify the virtual circuit. The header validators in the fabric elements and the N_Ports check all three identifiers to ensure that they designate a valid virtual circuit. Thus, if a soft error occurs in any of these identifiers such that the set of three do not match a valid virtual circuit, the associated frame is discarded.

The possibility of soft errors occurring in the set of three identifier fields presents a potential problem when an N_Port sends a EOFrt frame in an attempt to remove a class 4 connection. If a soft error occurs at some point through the connection, the removal frame may be received error-free at some fabric elements, but not all, resulting in only portions of the class 4 connection being removed. Once a fabric element believes that a virtual circuit is removed, it may reassign the VC_ID previously used for that virtual circuit to another. Thus, to prevent an EOFrt removal frame associated with one virtual circuit from inadvertently removing a newly created class 4 connection with the same VC_ID, the class 4 connection state machines within the fabric nodes check each of the three identifiers VC_ID, S_ID and D_ID to ensure that all three match and properly identify the virtual circuit before returning to the void state 50 (FIG. 2) to remove the connection. If an EOFrt frame includes an invalid set of identifiers (i.e., the entire set of VC_ID, S_ID and D_ID do not match any valid virtual circuit) that frame is simply discarded by the fabric like any other frame.

In one aspect of the invention, a method and apparatus is provided that enables the fabric itself to initiate removal of a class 4 connection when a hard error occurs. A hard error should be distinguished from soft errors, such as data errors, which result in the frame simply being discarded. Rather, as used herein, the term hard error is intended to indicate a hardware error, or an error in the microcode or software that controls the fabric. Hard errors may also include situations such as might arise as a result of a power failure, wherein the service connection state machine of some ports forming a class 4 connection may go down, resulting in those state machines re-entering the void state 50. If this occurs, holes may potentially develop in a class 4 connection, such that some of the switches that formed the connection will no longer recognize it as being established, while other switches will continue to support the class 4 connection.

Figure 4:
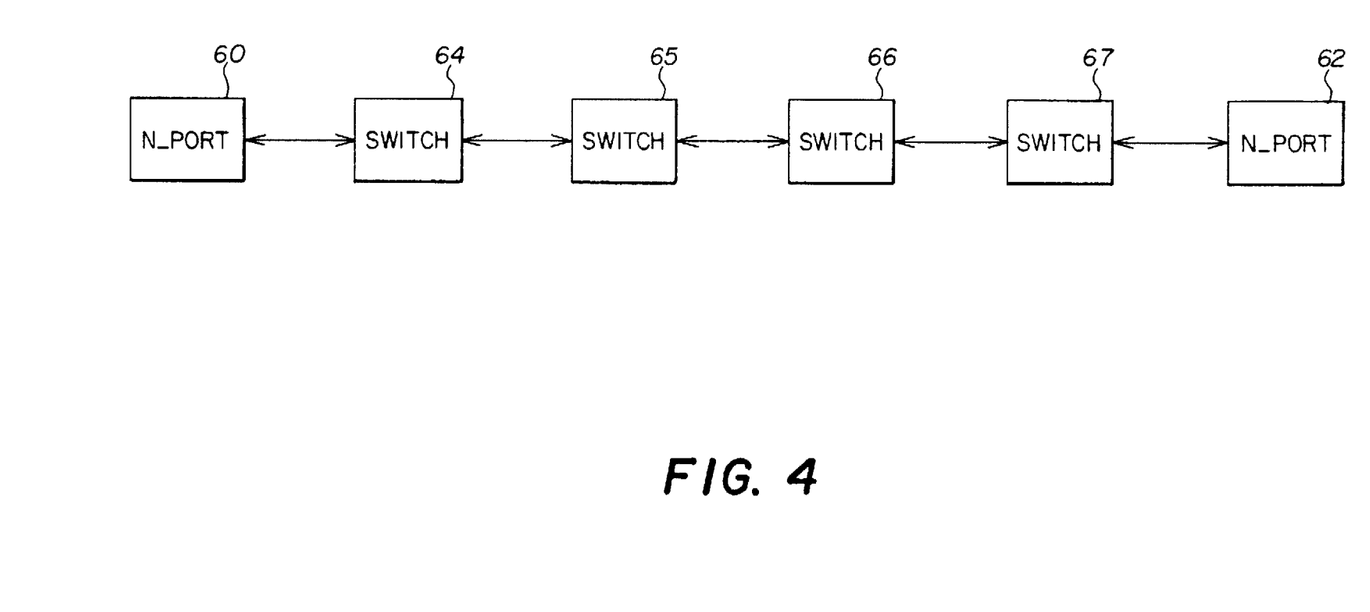
FIG. 4 is a block diagram of a virtual connection in a Fibre Channel system.

FIG. 4 provides an example of a class 4 connection formed between two N_Ports 60 and 62 in a Fibre Channel system. The class 4 connection is established between these N_Ports through a plurality of switches 64-67, each of which represents a fabric element and its associated ports. In accordance with one aspect of the present invention, each of the switches 64-67 and N_Ports 60 and 62 is provided with the ability to detect a hard error in the class 4 connection, and in response, to transmit an EOFrt frame to remove the connection. This is shown for example in FIG. 3, wherein F_Port 78 includes an error detector 130 for detecting an error in the virtual connection, and a removal frame generator for generating a removal frame to remove the virtual connection when an error is detected. N_Port 74 is similarly provided with an error detector 132 and a removal frame generator 134.

The hard errors detected by each of error detectors 130 and 134 can be in its associated port, such as if switch 78 detects that it is failing to satisfy the guaranteed QoS parameters for the class 4 connection, or can be detected from another switch or device in the class 4 connection. For example, if switch 66 (FIG. 4) were to go down, this hard error would be detected by both switches 65 and 67. Each of switches 65 and 67 would then transmit an EOFrt frame to remove the class 4 connection. The EOFrt frame transmitted from switch 65 would be received by both switch 64 and N_Port 60, causing the class 4 connection state machine within each to return to the void state 50 (FIG. 2). Similarly, the EOFrt frame transmitted from switch 67 would be received by N_Port 62 causing it to enter its void state. The EOFrt frames transmitted by both switches 65 and 67 might also be processed by switch 66, depending upon the type of hard error and whether it retains the capability of receiving such a frame, and may result in the class 4 connection state machine in switch 66 also returning to its void state. It should be understood that by causing the class 4 connection state machines to return to the void state, the EOFrt results in a removal of the entire class 4 connection, including both virtual circuits, even if an error is detected in only one of the virtual circuits of the connection.

One advantageous feature of the error recovery technique of the present invention is that it can be initiated by each and every switch and N_Port in a class 4 connection. Thus, even if a power failure or a series of hard errors results in a class 4 connection being split into multiple fragments, this condition will be detected by the switches and/or the N_Ports, which will then issue EOFrts to ensure that every fragment of the class 4 connection is removed.

Another advantageous feature of the error recovery technique of the present invention is that the removal frame (i.e., EOFrt) is sent along the very path of the class 4 connection that is to be removed, and includes an identifier that is targeted specifically to the circuit to be removed. This targeting is ensured because the EOFrt data frame includes three identifiers that uniquely identify the virtual circuit to be removed (i.e., VC_ID, S_ID and D_ID). As stated above, although the removal frame identifies only a single virtual circuit of a class 4 connection, both are removed when the removal frame is received. Thus, if a switch goes down and then reassigns the VC_ID for a previously formed class 4 connection to another class 4 connection, the newly established class 4 connection will not be removed by a removal frame targeted to the class 4 connection that previously used that VC_ID, because the S_ID and D_ID fields will not match. When a EOFrt frame is received by a switch or N_Port and does not include a valid set of three identifiers, the frame is simply discarded as with any other frame in the manner described above.

As should be appreciated from the foregoing, when hard errors are detected by multiple switches in a class 4 connection, the removal frames transmitted by those circuits will only propagate through the fabric to the extent that portions of the connection remain established. For example, if hard errors are simultaneously detected by switches 64 and 67 in the class 4 connection shown in FIG. 4, they will respectively transmit removal frames to switches 65 and 66. Once either of switches 65 and 66 has processed one of the removal frames, the arrival of the other will be detected as not indicating any valid class 4 connection, and therefore, it will simply be discarded. Thus, once the two removal frames arrive at a common switch, they will go no further. The targeted nature of the removal frames also ensures that the frames will not be processed by any other portion of the fabric and thereby inadvertently disrupt other established connections.

It should be understood the various changes and modifications of the embodiments shown in the drawings and described in the specification may be made within the scope of the invention. It is intended that all matter contained in the above-description and shown in the accompanying drawings be interpreted in an illustrative and not in a limiting sense. The invention is limited only as defined in the following claims and the equivalents thereto.

What is claimed:

1. In a component for being disposed in a communication system including at least one other component, an apparatus comprising:

means for establishing a virtual connection through the communication system between the component and the at least one other component;

receiving means for receiving information frames transmitted over the virtual connection from the at least one other component;

transmitting means for transmitting information frames over the virtual connection from the component to the at least one other component; and a state machine, coupled to the transmitting means, that controls use of the virtual connection by the component, the state machine defining a live state of the virtual connection wherein a minimum bandwidth is guaranteed for transmission of information frames between the component and the at least one other component over the virtual connection, the state machine further defining a dormant state of the virtual connection wherein the minimum bandwidth is not guaranteed for the transmission of information frames between the component and the at least one other component over the virtual connection.

2. The apparatus recited in claim 1, wherein the state machine further defines a void state of the virtual connection wherein the component is removed from the virtual connection so that no information frames can be transmitted between the component and the at least one other component over the virtual connection, and wherein the state machine is responsive to a request from either of the component and the at least one other component to transition to the void state from either of the live state and the dormant state.

3. The apparatus recited in claim 1, wherein the state machine further defines a pending state wherein a determination is made as to whether a requested virtual connection is to be established, and wherein the state machine enters the pending state in response to a request to establish the virtual connection from either of the component and the at least one other component.

4. The apparatus recited in claim 3, wherein the state machine transitions from the pending state to the dormant state when the request to establish the virtual connection is accepted.

5. The apparatus recited in claim 1, wherein the state machine transitions from the dormant state to the live state in response to a request to enter the live state from either of the component and the at least one other component.

6. The apparatus recited in claim 1, wherein the state machine transitions from the live state to the dormant state in response to a request to enter the dormant state from either of the component and the at least one other component.

7. The apparatus recited in claim 1, wherein the information frames transmitted over the virtual connection are transmitted over a link from the component to the at least one other component, and wherein the apparatus further includes:

means for establishing a frame credit reserve for the link;

means for decrementing the frame credit reserve when an information frame is transmitted over the link from the component to the at least one other component;

means for incrementing the frame credit reserve when a signal is received indicating that the at least one other component is capable of processing an information frame transmitted from the component; and means, coupled to the transmitting means, for inhibiting transmission of an information frame over the link when the frame credit reserve is zero.

8. The apparatus recited in claim 7, wherein the state machine fixes the frame credit reserve to one while the virtual connection is in the dormant state.

9. The apparatus recited in claim 7, wherein the state machine further defines a pending state wherein a determination is made as to whether a requested virtual connection is to be established, wherein the state machine enters the pending state in response to a request to establish the virtual connection from either of the component and the at least one other component, and wherein the state machine fixes the frame credit reserve to zero while the virtual connection is in either of the pending state and the dormant state.

10. A method for removing a virtual connection between first and second devices in a communication system, the communication system including at least one switch virtually connecting the first and second devices, the method comprising the steps of:

(A) detecting in at least one of the first and second devices and the at least one switch an error in the virtual connection;

(B) transmitting a request to remove the virtual connection from the at least one of the first and second devices and the at least one switch in which the error is detected;

(C) removing the virtual connection from the communication system in response to transmission of the request;

wherein step (B) includes transmitting the request to remove the virtual connection as an information frame over the virtual connection; and wherein the at least one of the first and second devices and the at least one switch in which the error is detected is the first device, and wherein steps (B) and (C) include steps of:

transmitting the information frame from the first device to the at least one switch and the second device;

removing the first device from the virtual connection in response to detection of the error;

removing the second device from the virtual connection in response to receipt of the information frame at the second device; and removing the at least one switch from the virtual connection in response to receipt of the information frame at the at least one switch.

11. The method for removing a virtual connection as recited in claim 10, further including a step of assigning an identifier to the virtual connection, and wherein:

step (B) includes a step of including the identifier in the information frame;

the step of removing the second device from the virtual connection in response to receipt of the information frame at the second device includes a step of removing the second device from the virtual connection only when the virtual connection identifier in the information frame received at the second device matches the identifier assigned to the virtual connection; and the step of removing the at least one switch from the virtual connection in response to receipt of the information frame at the at least one switch includes a step of removing the at least one switch from the virtual connection only when the virtual connection identifier in the information frame received at the at least one switch matches the identifier assigned to the virtual connection.

12. A method for removing a virtual connection between first and second devices in a communication system, the communication system including at least one switch virtually connecting the first and second devices, the method comprising the steps of:

(A) detecting in at least one of the first and second devices and the at least one switch an error in the virtual connection;

(B) transmitting a request to remove the virtual connection from the at least one of the first and second devices and the at least one switch in which the error is detected;

(C) removing the virtual connection from the communication system in response to transmission of the request;

wherein step (B) includes transmitting the request to remove the virtual connection as an information frame over the virtual connection; wherein the at least one of the first and second devices and the at least one switch in which the error is detected is the at least one switch, and wherein steps (B) and (C) include steps of:

transmitting the information frame from the at least one switch to the first and second devices;

removing the at least one switch from the virtual connection in response to detection of the error;

removing the first device from the virtual connection in response to receipt of the information frame at the first device; and removing the second device from the virtual connection in response to receipt of the information frame at the second device.

13. The method for removing a virtual connection as recited in claim 12, further including a step of assigning an identifier to the virtual connection, and wherein:

step (B) includes a step of including the identifier in the information frame;

the step of removing the first device from the virtual connection in response to receipt of the information frame at the first device includes a step of removing the first device from the virtual connection only when the virtual connection identifier in the information frame received at the first device matches the identifier assigned to the virtual connection; and the step of removing the second device from the virtual connection in response to receipt of the information frame at the second device includes a step of removing the second device from the virtual connection only when the virtual connection identifier in the information frame received at the second device matches the identifier assigned to the virtual connection.

14. A method for removing a virtual-connection between first and second devices in a communication system wherein the communication system includes at least one switch virtually connecting the first and second devices, the method comprising the steps of:

(A) assigning a first identifier to the first device, (B) assigning a second identifier to the second device, (C) assigning a third identifier to the virtual-connection, (D) detecting in the at least one switch an error in the virtual-connection;

(E) transmitting a request-to-remove the virtual-connection from the at least one switch in which the error is detected;

(F) removing the virtual-connection from the communication system in response to transmission of the request-to-remove;

wherein step (E) includes transmitting the request-to-remove the virtual-connection as an information-frame, wherein step (E) includes including the first, second and third-identifiers in the information-frame; and wherein step (E) includes the step of transmitting the information-frame from the at least one switch to the first and second devices; wherein step (F) includes the steps of;

removing the at least one switch from the virtual-connection in response to detection of the error;

determining in the first device whether the first, second and third identifiers in the information-frame received at the first device respectively match the first, second and third identifiers respectively assigned to the first device, the second device and the virtual-connection, and when they do, removing the first device from the virtual-connection; and determining in the second device whether the first, second and third identifiers in the information frame received at the second device respectively match the first, second and third identifiers respectively assigned to the first device, the second device and the virtual-connection, and when they do, removing the second device from the virtual-connection.

15. The method for removing a virtual connection as recited in claim 14, wherein the at least one of the first and second devices and the at least one switch in which the error is detected is the first device, and wherein steps (E) and (F) include steps of:

transmitting the information frame from the first device to the at least one switch and the second device;

removing the first device from the virtual connection in response to detection of the error;

determining in the at least one switch whether the first, second and third identifiers in the information frame received at the at least one switch respectively match the first, second and third identifiers respectively assigned to the first device, the second device and the virtual connection, and when they do, removing the at least one switch from the virtual connection; and determining in the second device whether the first, second and third identifiers in the information frame received at the second device respectively match the first, second and third identifiers respectively assigned to the first device, the second device and the virtual connection, and when they do, removing the second device from the virtual connection.

16. A communication system including an apparatus and a plurality of interconnected components, comprising:

establishing-means for establishing a virtual-connection between the apparatus and at least one of the plurality of interconnected components;

assigning-means for assigning the virtual-connection a first identifier, for assigning the apparatus a second identifier, and for assigning the at least one of the plurality of interconnected components a third identifier;

detecting-means for detecting an error in the virtual-connection;

responsive-means responsive to the detecting-means for transmitting from the at least one of the plurality of interconnected components a request-to-remove an identifier-specified-virtual-connection from the communication system;

the request-to-remove the identifier-specified-virtual-connection from the communication system being an information frame that includes first, second and third identifiers;

receiving-means for receiving the request-to-remove the identifier-specified-virtual-connection from the communication system;

determining means responsive to the receiving-means for determining whether the virtual-connection established between the apparatus and the at least one of the plurality of components is the identifier-specified-virtual-connection; and removal-means responsive to the determining-means for removing the apparatus from the virtual-connection when the virtual-connection that is established between the apparatus and the at least one of the plurality of interconnected components is determined to be the identifier-specified-virtual-connection.

17. A method for removing a virtual-connection established between a first device and a second device in a communication system, wherein the communication system includes at least one switch virtually connection the first and second devices, comprising the steps of:

assigning a first-identifier to the first device;

assigning a second-identifier to the second device;

assigning a third-identifier to the virtual connection, transmitting an information-frame over the virtual-connection communication system;

the information-frame including the first-identifier as a first-field, including the second-identifier as a second-field, and including the third-identifier as a third-field;

receiving the information-frame at a given one of the first device, the second device, or the at least one switch;

examining, at the given one of the first device, second device, or the at least one switch, the received information-frame in order to determine whether the first-field matches the first-identifier, whether the second-field matches the second-identifier, and whether the third-field matches the third-identifier; and removing the given one of the first device, the second device, or the at least one switch from the virtual connection only when the first-field matches the first-identifier, the second-field matches the second-identifier, and the third-field matches the third-identifier.

18. The method of claim 17 including the steps of:

examining, at the given one of the first device, second device, or the at least one switch, the received information-frame in order to determine whether the first-field matches the first-identifier, whether the second-field matches the second-identifier, and whether the third-field matches the third-identifier; and when the first-field does not match the first-identifier, and/or the second-field does not match the second-identifier, and/or the third-field does not match the third-identifier;

discarding the information frame received at the given one of the first device, second device, or the at least one switch.

19. A method for operating a virtual connection between first and second devices in a communication system, the communication system including at least one switch virtually connecting the first and second devices, the method comprising the steps of:

(A) establishing the virtual connection between the first and second devices;

(B) entering a live state of the virtual connection;

(C) transmitting information frames over the virtual connection between the first and second devices in the live state;

(C) transitioning the virtual connection from the live state to a dormant state wherein no information frames are transmitted between the first and second devices over the virtual connection;

wherein step (A) includes a step of establishing the virtual connection in response to a request transmitted by the first device; and wherein step (A) includes steps of:

entering a pending state of the virtual connection upon transmission from the first device of the request to establish the virtual connection; and establishing the virtual connection when the request is accepted by the second device and the at least one switch.

20. The method for operating a virtual connection as recited in claim 19, wherein the step of establishing the virtual connection when the request is accepted includes a step of entering the dormant state of the virtual connection.

21. The method for operating a virtual connection as recited in claim 20, wherein step (B) includes a step of entering the live state in response to a request to enter the live state from either of the first and second devices when the virtual connect ion is in the dormant state.

22. A method for operating a virtual connection between first and second devices in a communication system, the communication system including at least one switch virtually connecting the first and second devices, the method comprising the steps of:

(A) establishing the virtual connection between the first and second devices;

(B) entering a live sate of the virtual connection;

(C) transmitting information frames over the virtual connection between the first and second devices in the live state;

(D) transitioning the virtual connection from the live state to a dormant state wherein no information frames are transmitted between the first and second devices over the virtual connection; and (E) providing a state machine in at least one of the at least one switch and the first and second devices that controls entry of the virtual connection into the live and dormant states at the at last one of the at least one switch and the first and second devices.

23. A method for operating a virtual connection between first and second devices in a communication system, the communication system including at least one switch virtually connecting the first and second devices, the method comprising the steps of:

(A) establishing the virtual connection between first and second devices;

(B) entering a live state of the virtual connection;

(C) transmitting information frames over the virtual connection between the first and second devices in the live state;

(D) transitioning the virtual connection from the live state to a dormant state wherein no information frames are transmitted between the firsts and second devices over the virtual connection;

(E) transitioning the virtual connection from the dormant state to the live state; and (F) after transitioning from the dormant state to the live state, transmitting additional information frames over the virtual connection between the first and second devices;

wherein step (A) requires a first time period to establish the virtual connection, and wherein step (E) requires a second time period to transition from the dormant state to the live state of the virtual connection, and wherein the second time period is less than the first time period.

24. A method for operating a virtual connection between first and second devices in a communication system, the communication system including at least one switch virtually connecting the first and second devices, the method comprising the steps of:

(A) establishing the virtual connection between the first and second devices;

(B) entering a live state of the virtual connection;

(C) transmitting information frames over the virtual connection between the first and second devices in the live state;

(D) transitioning the virtual connection from the live state to a dormant state wherein no information frames are transmitted between the first and second devices over the virtual connection;

wherein step (A) includes a step of establishing the virtual connection in response to a request transmitted by the first device; and wherein step (A) includes steps of:

entering a pending state of the virtual connection upon transmission of the request from the first device to establish the virtual connection; and inhibiting establishment of the virtual connection when the request is rejected by either of the second device and the at least one connection.

25. A method for operating a virtual connection between first and second devices in a communication system, the communication system including at least one switch virtually connecting the first and second devices, the method comprising the steps of:

(A) establishing the virtual connection between the first and second devices;

(B) entering a live state of the virtual connection;

(C) transmitting information frames over the virtual connection between the first and second devices in the live state;

(D) transitioning the virtual connection from the live state to a dormant state wherein no information frames are transmitted between the first and second devices over the virtual connection;

wherein step (A) includes establishing the virtual connection to have a minimum bandwidth guaranteed, and wherein step (D) includes making the minimum bandwidth guaranteed for the virtual connection available for use by other connections in the communication system while the virtual connection is in the dormant state.

26. The method for operating a virtual connection as recited in claim 25, wherein the information frames transmitted over the virtual connection are transmitted over a first link from the first device to the at least one switch and over a second link from the at least one switch to the second device, and wherein:

step (A) includes establishing a first buffer-to-buffer credit reserve for the first link and a second buffer-to-buffer credit reserve for the second link; and step (C) includes steps of:
transmitting an information frame over the first link only when the first buffer-to-buffer credit reserve has a non-zero value;
decrementing the first buffer-to-buffer credit reserve when an information frame is transmitted over the first link from the first device to the at least one switch;
incrementing the first buffer-to-buffer credit reserve when the at least one switch is capable of processing an information frame transmitted from the first device;
transmitting an information frame over the second link only when the second buffer-to-buffer credit reserve has a non-zero value;
decrementing the second buffer-to-buffer credit reserve when an information frame is transmitted over the second link from the at least one switch to the second device; and
incrementing the second buffer-to-buffer credit reserve when the second device is capable of processing an information frame transmitted from the at least one switch.

27. The method for operating a virtual connection as recited in claim 26, wherein step (D) includes a step of fixing the first and second buffer-to-buffer credit reserves to one while the virtual connection is in the dormant state.

28. The method for operating a virtual connection as recited in claim 26, wherein steps (A) and (B) include steps of:

entering a pending state of the virtual connection upon transmission of a request from the first device to establish the virtual connection;

fixing the first and second buffer-to-buffer credit reserves to zero while the virtual connection is in the pending state; and establishing the virtual connection when the request is accepted by the second device and the at least one switch.

29. The method for operating a virtual connection as recited in claim 26, wherein:

the step of incrementing the first buffer-to-buffer credit reserve when the at least one switch is capable of processing an information frame transmitted from the first device includes steps of;
establishing a first maximum credit limit for the first buffer-to-buffer credit reserve; and
preventing the first buffer-to-buffer credit reserve from exceeding the first maximum credit limit.

* * * * *